United States Patent [19]
Maeda

[11] Patent Number: 5,251,928
[45] Date of Patent: Oct. 12, 1993

[54] UPPER MOUNTING STRUCTURE FOR A STRUT-TYPE WHEEL SUSPENSION

[75] Inventor: Kazushige Maeda, Zushi, Japan

[73] Assignee: Nissan Motor Company, Ltd., Japan

[21] Appl. No.: 867,545

[22] Filed: Apr. 13, 1992

[30] Foreign Application Priority Data
  May 31, 1991 [JP] Japan .................... 3-156131

[51] Int. Cl.$^5$ ............................ B60G 11/42
[52] U.S. Cl. ............................ 280/688; 267/195
[58] Field of Search .............. 280/688, 690, 692, 696, 280/722, 724; 267/8, 20

[56] References Cited
U.S. PATENT DOCUMENTS
  4,274,655  6/1981  Lederman ........................ 280/688

FOREIGN PATENT DOCUMENTS
  62-25206  2/1987  Japan .

OTHER PUBLICATIONS
SAE Paper No. 901729, "The Development of Hydraulic Strut Mount", Z. Nakajima et al.
Datsun 180SC Service Manual, Model S110 Series, p. FA-8.

*Primary Examiner*—Jesus D. Sotelo
*Attorney, Agent, or Firm*—Lowe, Price, LeBlanc & Becker

[57] ABSTRACT

An upper mounting structure for a strut-type wheel suspension is of a so-called concentrated input type which includes a coil spring and a strut assembly arranged in parallel to each other between a strut mounting insulator and an unsprung mass of a suspension. The structure further includes a hydraulic mount thorough which a strut assembly is coupled with the coil spring and the strut mounting insulator, whereby coexistence of a comfortable ride feeling of a vehicle and an antivibration and noise characteristic can be realized without disappearance of a surge vibration absorbing function to be effected in the vibration concentrated input type structure.

2 Claims, 7 Drawing Sheets

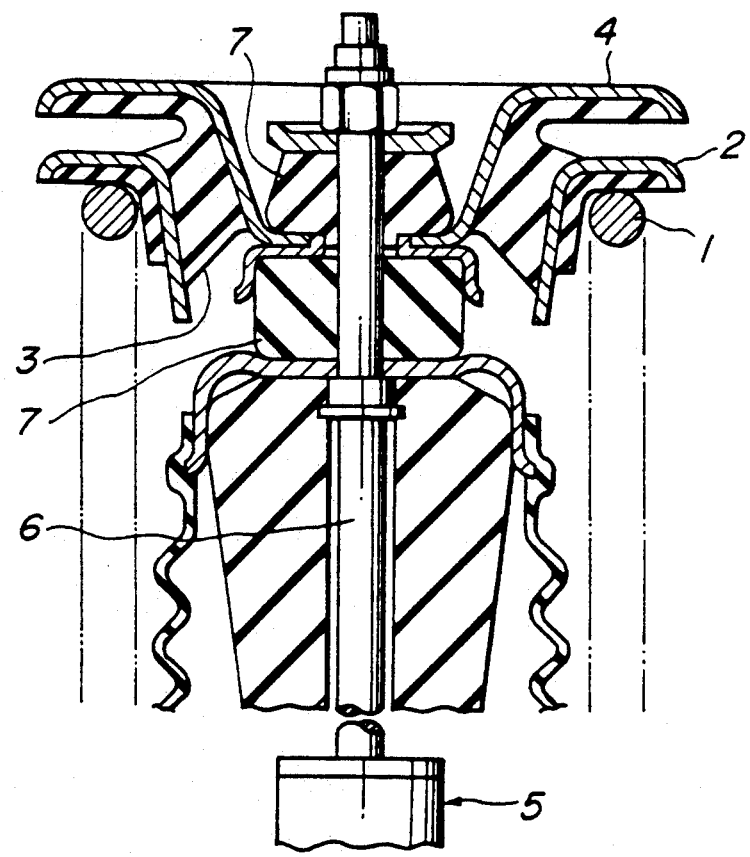
FIG_1
PRIOR ART

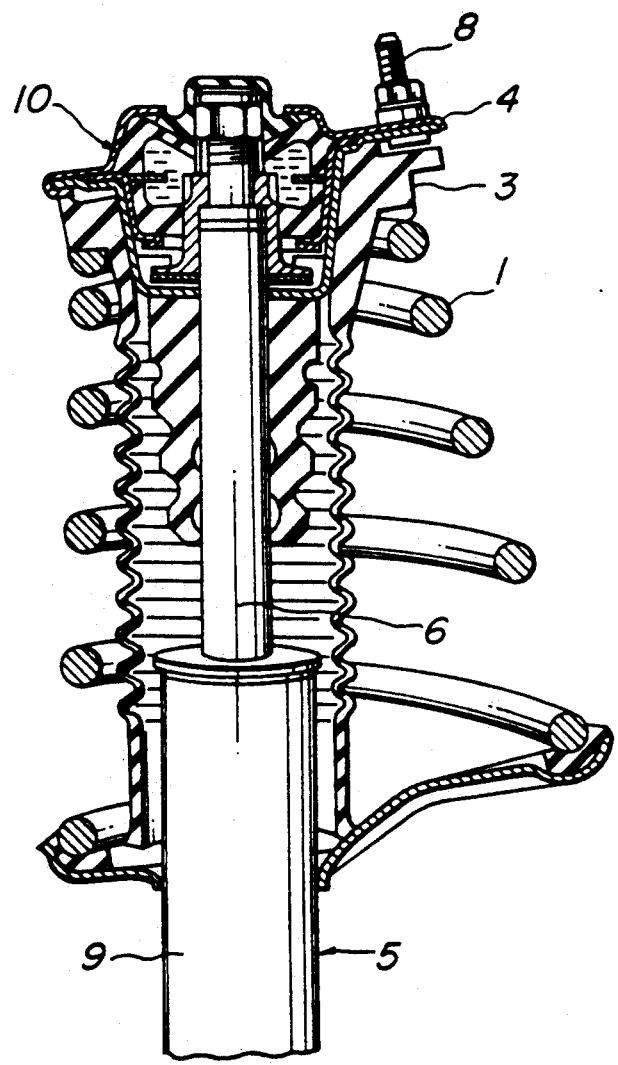
FIG_2
PRIOR ART

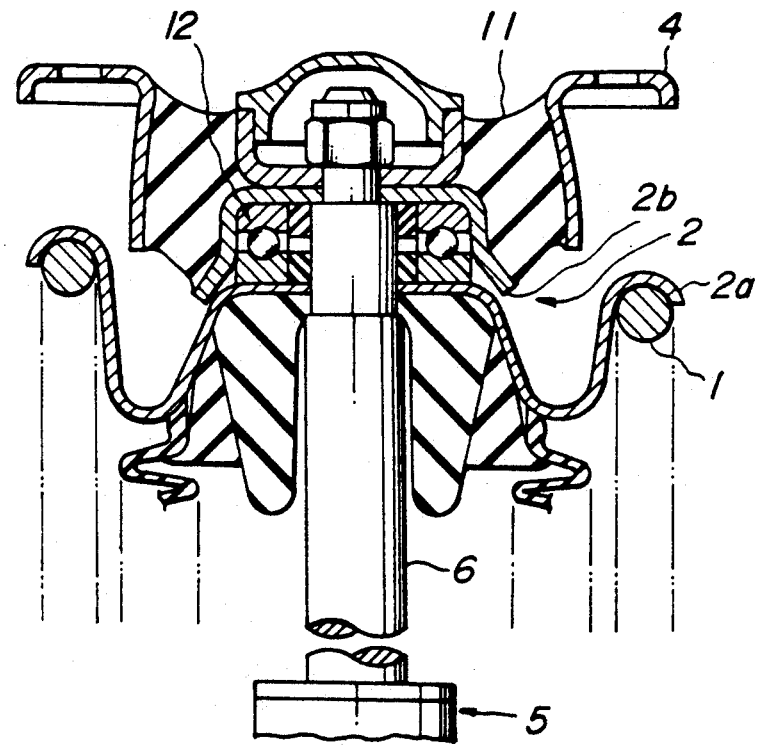
FIG_3
PRIOR ART

FIG_5
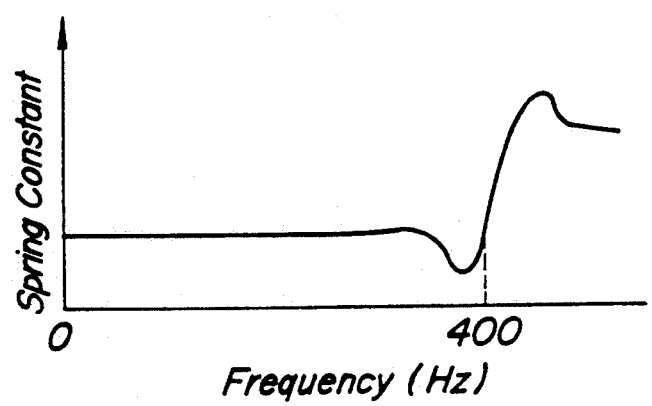

UPPER MOUNTING STRUCTURE FOR A STRUT-TYPE WHEEL SUSPENSION

BACKGROUND OF THE INVENTION

1. Field of the Invention

The present invention relates to an upper mounting structure for a strut-type wheel suspension suitably used for suspending a wheel from a vehicle body, which is capable of reducing a transmission of vibration from the wheel to the vehicle body, thereby providing a comfortable ride feeling of a vehicle.

2. Description of the Related Art

Typical examples of conventional upper mounting structure for a strut-type wheel suspension are as shown in FIGS. 1 to 3. The upper mounting structure for a strut-type wheel suspension as shown in FIGS. 1 and 2 is of a so-called isolated input type and the structure as shown in FIG. 3 is of a so-called concentrated input type.

The isolated input type structure in FIG. 1 is disclosed in Japanese Utility Model Application Laid-Open Publication No. 62-25206. In this structure a coil spring 1 is seated at its upper end on a spring support 2 which is coupled with an upper support 4 through a spring insulator 3 of resilient material. The upper support 4 is adapted to be fastened to a vehicle body not shown by a bolt and nut means. The coil spring 1 is directly or resiliently engaged at its lower end to an outer sleeve of a strut assembly 5. A piston rod 6 of the strut assembly 5 freely penetrates through a central opening of the upper support 4 and is secured thereto by means of a pair of rod mounting insulators 7 of resilient material arranged on either side of the upper support 4. On the other hand, the outer sleeve of the strut assembly 5 is resiliently or rigidly coupled with a knuckle not shown which is articulated to a vehicle body or a subframe fixed thereto not shown through a plurality of links.

The isolated input type structure in FIG. 2 is disclosed in SAE Paper No. 901729. In this structure a coil spring 1 is seated at its upper end on a spring insulator 3 of resilient material which is secured to an upper support 4 directly. The upper support 4 is adapted to be fastened to a vehicle body not shown by a bolt and nut means. The coil spring 1 is resiliently engaged at its lower end to an outer sleeve 9 of a strut assembly 5. A piston rod 6 of the strut assembly 5 freely penetrates through a central opening of the upper support 4 and is connected thereto through a rod mounting insulator 10 consisted of a hydraulic mount. On the other hand, an outer sleeve 9 of the strut assembly 5 is resiliently or rigidly coupled with a knuckle not shown which is articulated to a vehicle body or a subframe fixed thereto not shown through a plurality of links.

The concentrated input type structure in FIG. 3 is disclosed in "DATSUN 180SX SERVICE MANUAL, MODEL S110 SERIES" issued by "NISSAN MOTOR CO., LTD." on September, 1979. In this structure a piston rod 6 of a strut assembly 5 is rigidly coupled with a spring support 2 which includes a lower spring support part 2a and an upper spring support part 2b. A coil spring 1 is seated at its upper end on the lower spring support part 2a. The upper spring support part 2b is coupled with an upper support 4 through a strut mounting insulator 11 of resilient material. The upper support 4 is adapted to be fastened to a vehicle body not shown by a bolt and nut means. The coil spring 1 is resiliently or rigidly engaged at its lower end to an outer sleeve of the strut assembly 5. Other constructions of the disclosed upper mounting structure is essentially the same as that of the structure shown in FIG. 1. Now, in FIG. 3, the shown structure is constructed to be useful in a front wheel suspension, so that a bearing 12 is interposed between the lower and upper spring support parts 2a and 2b for easiness of wheel steering.

Each conventional upper mounting structure for a strut-type wheel suspension described above has following problems which will be discussed with respect to FIGS. 4a, 4b and 4c.

FIGS. 4a, 4b and 4c show vibration system models of the structures in FIGS. 1, 2, and 3 respectively. As appreciated from FIG. 4a, the isolated input type structure in FIG. 1 can provide a comfortable ride feeling of a vehicle, since the rod mounting insulator 7 through which the strut assembly 5 is coupled with the vehicle body 14 is made from resilient material of low spring constant both in the longitudinal and transverse directions of the vehicle body 14 in order to successfully avoid that a low frequency vibration input from a road to an unsprung mass 13 of the strut-type wheel suspension may be transmitted to the vehicle body 14 through the strut assembly 5.

In this structure, however, the spring insulator 3 of resilient material has to support a vehicle weight and is designed to have a spring constant more than twice of that of the rod mounting insulator 7, so that when a vertical surge vibration of the coil spring 1 is energized due to vibration input from a road, this surge vibration is transmitted to the vehicle body 14 from an upper end of the coil spring 1 through the spring insulator 3 of large spring constant. This surge vibration is also transmitted to the outer sleeve of the strut assembly 5 through a lower end of the coil spring 1. Well, at high frequency range within which the surge vibration tends to be energize, the piston rod 6 and the outer sleeve of the strut assembly 5 is suppressed to move telescopically to each other because of large oscillation damping effect of the strut assembly 5, so that the above surge vibration is almost directly transmitted to the piston rod 6. This causes a vertical vibration of the strut assembly 5 since the rod mounting insulator 7 is of low spring constant as mentioned above, and then the above vertical vibration of the strut assembly 5 causes the knuckle to be rocked about a center of gravity thereof. This rock motion of the knuckle causes transverse vibration of the vehicle body 14 since the knuckle is articulated to the vehicle body through the plurality of links, and this transverse vibration of the vehicle body 14 together with the above mentioned surge vibration through the spring insulator 3 give rise to compartment noise.

As appreciated from FIG. 4b, the isolated input type structure in FIG. 2 is designed by replacing the rod mounting insulator 7 of resilient material with the hydraulic mount type of rod mounting insulator 10 through which the strut assembly 5 is coupled with the vehicle body 14. In this arrangement the hydraulic mount type of rod mounting insulator 10 is designed to have low spring constant at relative low frequency range except for high frequency range as shown in FIG. 5 for reduction of road noise, so that this arrangement also can not reduce a vibration input due to said surge vibration of the coil spring 1 similarly to the structure in FIG. 1.

On the contrary, in the concentrated input type structure in FIG. 3, as appreciated from FIG. 4c a vibration input from a road to the unsprung mass 13 of the wheel suspension is transmitted to the spring support 2 through the coil spring 1 as well as the strut assembly 5 and the vibration, thereafter, is transmitted to the upper support 4 and the vehicle body 14 through the strut mounting insulator 11, but because of the construction in which the coil spring 1 and the strut assembly 5 are directly coupled with each other in mutual parallel relation, even though surge vibration of the coil spring 1 has occurred, this surge vibration is absorbed as an internal force in closed loop including the coil spring 1 and the strut assembly 5 by the strut assembly 5, and thus the compartment noise due to the surge vibration may be successfully suppressed.

In the described structure, however, the strut mounting insulator 11 of resilient material is designed to have a high spring constant since it must support a vehicle weight by itself, and then the strut assembly 5 is designed to perform a damping effect at a lower frequency range upto the resonance frequency of the unsprung mass 13 for suppressing a resonance of the unsprung mass 13, so that vibration to the vehicle body at the lower frequency range upto said resonance frequency can not be reduced effectively. Also at a higher frequency range, since the strut assembly 5 performs a large damping effect to restrict the relative telescopical movement between the piston rod 6 and the outer sleeve of the strut assembly 5, the majority of a vibration input from a road to the unsprung mass 13 is transmitted to the vehicle body 14 through the strut assembly 5 of large damping effect and the strut mounting insulator 11 of high spring constant. Therefore, the described structure has problems of an uncomfortable ride feeling of a vehicle and a low anti-vibration and noise characteristic over the whole frequency range.

SUMMARY OF THE INVENTION

Therefore, it is an object of the present invention to solve the problems in the prior art.

Another object of the present invention is to provide an improvement of a concentrated input type of upper mounting structure for a strut-type wheel suspension to make it possible to establish a desired comfortable ride feeling of a vehicle and a desired anti-vibration and noise characteristic over the whole frequency range without disappearance of said surge vibration absorbing function to be performed in the concentrated input type structure.

In order to accomplish the above-mentioned and other objects, it is one aspect of the present invention to provide an upper mounting structure for a strut-type wheel suspension for a vehicle, comprising:

a strut assembly including an outer sleeve and a piston rod telescopically movable with respect to each other for suspension stroke, cooperating so that one of the sleeve and the piston rod supports a wheel rotatably and the other is to be connected with a vehicle body; a coil spring provided to act between said outer sleeve and said piston rod to energize the strut assembly in an extending direction;

a spring support on which an upper end of said coil spring is seated;

a hydraulic mount through which said spring support is coupled with one of the piston rod and the outer sleeve of the strut assembly to be connected with the vehicle body; and an upper support attached to said spring support through a strut mounting insulator, which is adapted to be fastened to the vehicle body.

According to another aspect of the invention, it is preferable that said rod mounting insulator is of low spring constant at lower frequency range of vibration, especially for reduction of a vibration input at lower frequency range.

According to a further aspect of the invention, it is preferable that said rod mounting insulator is of high spring constant at higher frequency range of vibration, especially for reduction of a vibration input at higher frequency range.

According to a still further aspect of the invention, it is preferable that said rod mounting insulator is of low spring constant at lower frequency range of vibration and of high spring constant at higher frequency range of vibration.

According to a still further aspect of the present invention, it is preferable that such rod mounting insulator is a hydraulic mount.

According to a still further aspect of the invention, it is preferable that said hydraulic mount has an anti-resonance frequency which is substantially the same as a resonance frequency of an unsprung mass of the strut-type wheel suspension so that the spring constant of the rod mounting insulator reaches a maximal value at the resonance frequency of an unsprung mass of the strut-type wheel suspension.

BRIEF DESCRIPTION OF THE DRAWINGS

FIG. 1 is a longitudinal cross sectional view of an example of a conventional upper mounting structure for a strut-type wheel suspension;

FIG. 2 is a longitudinal cross sectional view of a second example of a conventional upper mounting structure for a strut-type wheel suspension;

FIG. 3 is a longitudinal cross sectional view of a third example of a conventional upper mounting structure for a strut-type wheel suspension;

FIG. 5 shows a characteristic of a spring constant to an input frequency relative to the rod mounting insulator in the structure shown in FIG. 2;

DESCRIPTION OF THE PREFERRED EMBODIMENTS

Figure 6:
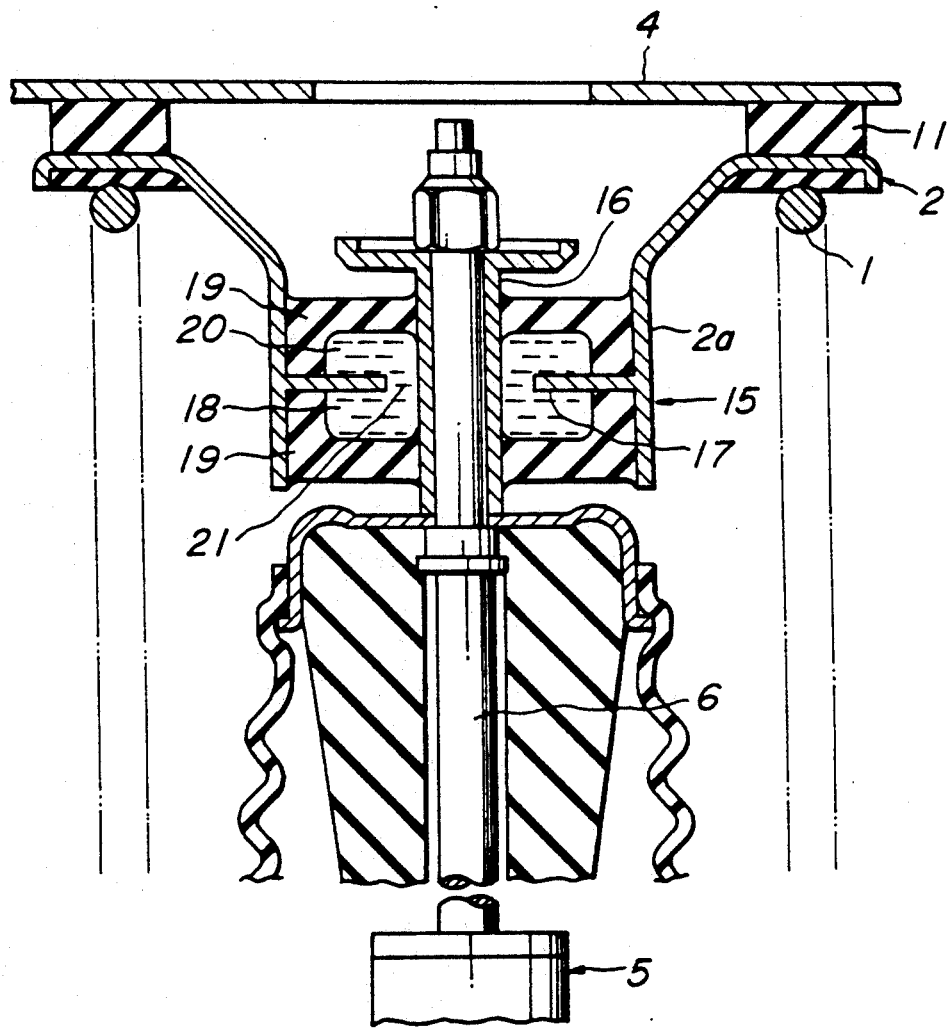
FIG. 6 is a longitudinal cross sectional view of an embodiment of an upper mounting structure for a strut-type wheel suspension according to the present invention.

Referring now to the drawings, FIG. 6 is a longitudinal cross sectional view of a preferred embodiment of an upper mounting structure for a strut-type wheel suspension according to the present invention. In FIG. 6, constructional elements similar to those in the foregoing conventional upper mounting structures for a strut-type wheel suspension will be represented by the same reference numerals.

The shown embodiment of the upper mounting structure for a strut-type wheel suspension according to the invention is essentially of a so-called concentrated input type. In the shown structure, a coil spring 1 is seated at its upper end on a spring support 2 which is coupled with an upper support 4 through a strut mounting insulator 11 of resilient material. The upper support 4 is adapted to be secured to a vehicle body not shown by a bolt and nut means. In addition, the coil spring 1 is directly or resiliently engaged at its lower end with an outer sleeve of a strut assembly 5 of which a piston rod 6 is connected to a rod collar 16 of a rod mounting insulator 15 centrally arranged in the spring support 2. The other construction is substantially the same as that in the above mentioned conventional upper mounting structure for a strut-type wheel suspension.

The rod mounting insulator 15 in this embodiment is of a hydraulic mount type as follows. The rod mounting insulator 15 includes a housing 2a integrally formed on the spring support 2 in shape of sleeve. The housing 2a is provided at its inner peripheral surface with an annular orifice plate 17 extending radially and inwardly. There is centrally arranged in the sleeve-shaped housing 2a said rod collar 16 which forms a restricted annular path 21 by cooperation with an inner peripheral edge of the orifice plate 17. Both of an upper side and a lower side of the orifice plate 17 there is arranged a pair of annular resilient members 19 each of which is adhered to a relevant side of the orifice plate 17, the inner peripheral surface of the sleeve-shaped housing 2a and an outer peripheral surface of the rod collar 16 by vulcanization in order to form a hydraulic chamber 18. The hydraulic chambers 18 formed in such manner are communicated to each other through said restricted annular path 21 and are filled with operating fluid 20.

Figure 7:
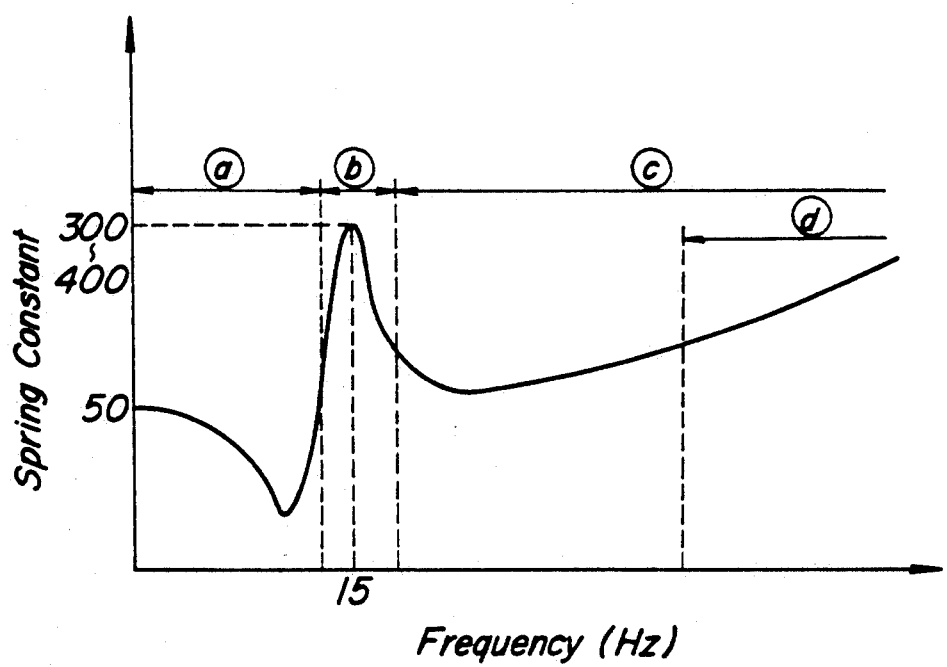
FIG. 7 shows an input frequency-spring constant characteristic relative to the hydraulic mount type of rod mounting insulator in the structure shown in FIG. 6.

In such rod mounting insulator 15, vibration input from the piston rod 6 of the strut assembly 5 is supplied to the rod collar 16 which deforms the resilient members 19 according to the vibration input level to cause a restricted flow of operating fluid 20 between the hydraulic chambers 18 through the restricted annular path 21. This results in a damping force of the rod mounting insulator 15 and this rod mounting insulator 15 performs a dynamic damper effect as an oscillating mass. Such damping force and dynamic damper effect make the hydraulic mount type of rod mounting insulator 15 to be of a frequency-spring constant characteristic as shown in FIG. 7 due to preferable sizing of relevant portions and tuning of properties of the resilient members 19. In FIG. 7, a spring constant of the hydraulic mount type of rod mounting insulator 15 reaches a maximal value at an anti-resonance frequency thereof which exists at an intermediate frequency range (b) near a resonance frequency 15 Hz of an unsprung mass of a strut-type wheel suspension. Furthermore, a spring constant of the hydraulic mount type of rod mounting insulator 15 is reduced at a lower frequency range (a), and then a spring constant of the hydraulic mount type of rod mounting insulator 15 is maintained higher at a higher frequency range (c) than at the lower frequency range and is gradually increased according to ascension of frequency. In FIG. 7, (d) represents a particular frequency range in the higher frequency range (c) usually causing said surge vibration of the coil spring 1.

On the other hand, the strut mounting insulator 11 of resilient material is used to couple the spring support 2 and the upper support 4 fixed to a vehicle body and thus has to support a vehicle weight only by itself, so that the strut mounting insulator 11 must be designed to be of high spring constant more than enough.

Figure 4A:
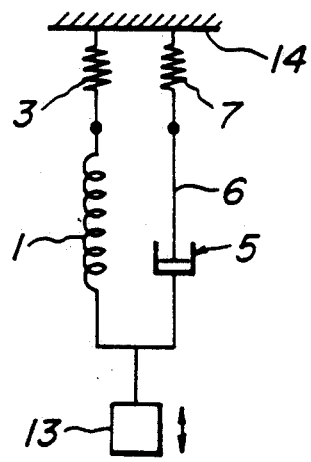
FIGS. 4a, 4b and 4c are schematic views showing vibration system models of the structures in FIGS. 1 to 3 respectively.
Figure 4B:
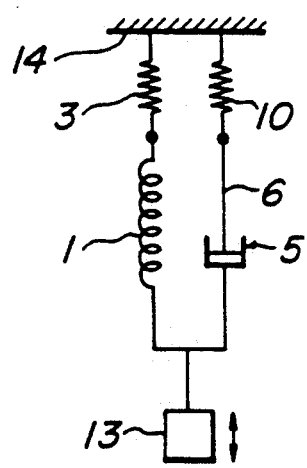
Figure 4C:
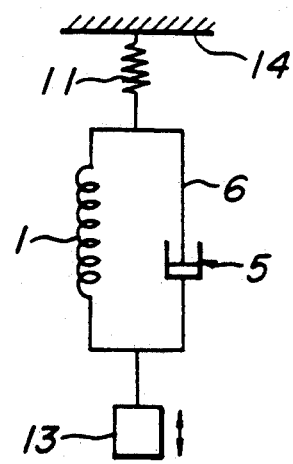
Figure 8:
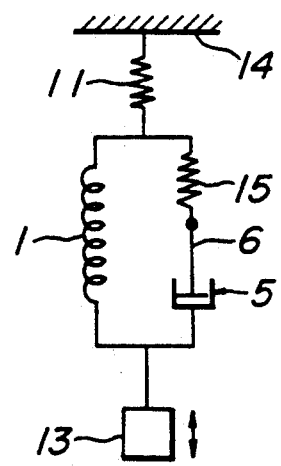
FIG. 8 is a schematic view showing vibration system model of the structure according to the present invention in FIG. 6.

FIG. 8 shows a vibration system model of the upper mounting structure for a strut-type wheel suspension in FIG. 6. As appreciated from FIG. 8, a strut-type wheel suspension including the upper mounting structure in FIG. 6 operates as follows. At the lower frequency range, the hydraulic mount type of rod mounting insulator 15 is of low spring constant as mentioned above with respect to FIG. 7, which makes small a stroke of the strut assembly 5 caused due to vibration input from a road to an unsprung mass 13 of the strut-type wheel suspension and thus which is capable of reducing an influence of damping force of the strut assembly 5. Therefore, an equivalent spring constant of the strut mounting insulator 11, the rod mounting insulator 15 and the strut assembly 5 serially arranged in turn along a vibration transmitting path is become small, so that a transmission of vibration from a road to the vehicle body 14 is effectively suppressed. Also at the higher frequency range, the above equivalent spring constant is smaller than that in the foregoing conventional structure, and thus a transmission of vibration from a road to the vehicle body 14 is effectively suppressed, since the strut assembly 5 is not rigidly coupled with the strut mounting insulator 11, but resiliently coupled with the strut mounting insulator 11 through the hydraulic mount type of rod mounting insulator 15 in spite of high spring constant thereof at the higher frequency range.

In the shown embodiment, furthermore, at the higher frequency range the hydraulic mount type of rod mounting insulator 15 acts to couple the coil spring 1 and the strut assembly 5 with a high spring constant, so that the strut assembly 5 can absorb a surge vibration of the coil spring 1 as an internal force of vibration system similarly to the conventional art in FIG. 3 and thus a compartment noise due to the surge vibration of the coil spring 1 can be effectively decreased.

As can be seen from the foregoing, in the shown embodiment of an upper mounting structure for a strut-type wheel suspension according to the invention, it is sure that a compartment noise due to the surge vibration of the coil spring 1 is effectively suppressed and then a transmission of vibration from a road to the vehicle body 14 is successfully reduced over wide frequency range from the lower frequency range to the higher frequency range, whereby a comfortable ride feeling of a vehicle and an anti-vibration and noise characteristic are able to be compatible with each other at high level.

In the shown embodiment of an upper mounting structure for a strut-type wheel suspension according to the invention, particularly, because of the construction in which the anti-resonance frequency of the hydraulic mount type of rod mounting insulator 15 is substantially the same as the resonance frequency of the unsprung mass 13 in the strut-type wheel suspension in such manner that the spring constant of the rod mounting insulator 15 reaches a maximal value at the resonance frequency of the unsprung mass 13, the damping force of the strut assembly 5 is sure to be effected more than enough at the resonance frequency of the unsprung mass 13 and thus a transmission of vibration due to the resonance of the unsprung mass 13 can be effectively reduced.

The shown embodiment is a preferred example of an upper mounting structure for a strut-type wheel suspension according to the invention. The invention is not limited to the shown embodiment and various modifications can be made to the invention. For example, the hydraulic mount used in the rod mounting insulator 15 can be replaced by another type of hydraulic mount well-known as an engine mount by those skilled in the art.

What is claimed is:

1. an upper mounting structure for a strut-type wheel suspension for a vehicle, comprising:
   (a) a strut assembly including an outer sleeve and a piston rod telescopically movable with respect to each other for suspension stroke, cooperating so that one of the sleeve and the piston rod supports a wheel rotatably and the other is to be connected with a vehicle body;
   (b) a coil spring providing to act between said outer sleeve and said piston rod to energize the strut assembly in an extending direction;
   (c) a spring support on which an upper end of said coil spring is seated;
   (d) a hydraulic mount through which said spring support is coupled with one of the piston rod and the outer sleeve of the strut assembly to be connected with the vehicle body; and
   (e) an upper support attached to said spring support through a strut mounting insulator, which is adapted to be fastened to the vehicle body.

2. An upper mounting structure for a strut-type wheel suspension as set forth in claim 1, said hydraulic mount has an anti-resonance frequency which is substantially the same as a resonance frequency of an unsprung mass of the strut-type wheel suspension so that the spring constant of the rod mounting insulator reaches a maximal value at the resonance frequency of an unsprung mass of the strut-like wheel suspension.

* * * * *